United States Patent [19]

Tang

[11] 3,876,616

[45] Apr. 8, 1975

[54] WET BLENDING OF FLUOROELASTOMER COMPOSITIONS

[75] Inventor: Walter Kwei-Yuan Tang, Wilmington, Del.

[73] Assignee: E. I. du Pont de Nemours and Company, Wilmington, Del.

[22] Filed: May 29, 1973

[21] Appl. No.: 364,923

[52] U.S. Cl....... 260/47 UA; 260/80.76; 260/80.77; 260/87.7; 260/96 R
[51] Int. Cl.................... C08f 47/22; C08f 15/40
[58] Field of Search............ 260/87.7, 47 UA, 96 R

[56] References Cited
UNITED STATES PATENTS

| 3,214,404 | 10/1965 | Fabry et al.......................... 260/41.5 |
| 3,752,789 | 8/1973 | Khan............................... 260/47 UA |

*Primary Examiner*—Stanford M. Levin

[57] ABSTRACT

A fluoroelastomer composition containing curing agents and/or other additives can be prepared with surprising efficiency and safety by A. continuously feeding to a mixer wet fluoroelastomer crumb,
B. continuously feeding to said mixer during step A at least one finely-divided solid material, for example a powder composed of a mixture of a cross-linking agent and a vulcanization accelerator for the fluoroelastomer,
C. continuously mixing the step A and step B materials while passing them through the mixer and maintaining the particulate nature of the crumb,
D. continuously drying the resulting mixed particulate material by passing it through a drying zone, and preferably
E. subjecting the mixed and dried particulate material to sufficient pressure and heat (e.g. in an extrusion apparatus) to form the material into a fused-together compact mass.

16 Claims, No Drawings

WET BLENDING OF FLUOROELASTOMER COMPOSITIONS

BACKGROUND OF THE INVENTION

This invention concerns a useful process for preparing fluoroelastomer compositions.

Fluoroelastomers are known to be useful in specialized areas, such as high temperature-resistant gaskets, seals, diaphragms, and tubing. Fabricated fluoroelastomer articles can withstand temperatures of about 250°–350°C while retaining their good elasticity.

It is necessary for many applications, for example gaskets for high-temperature reactors, that the fluoroelastomer article be resilient and have low compression set. This is accomplished by curing the article; that is, by vulcanizing or cross-linking the elastomer.

The industries which manufacture and use fluoroelastomer compositions for the production of cured fluoroelastomer articles are in need of a new process which permits the blending of a fluoroelastomer with certain additives with improved efficiency and with a high level of safety to the workers, the apparatus used and the composition. This applies especially to blending such additives as cross-linking agents and vulcanization accelerators with the fluoroelastomer. Known methods of blending curing ingredients with a fluoroelastomer, including mill-blending of dry powder additives with dry fluoroelastomer, involve considerable risk of harm to plant operators, harm to plant apparatus and harm to product quality. There is a particular need for a safe and efficient process for preparing a precompounded composition which contains the fluoroelastomer and one or more curing ingredients, and which will later be blended with carbon black, a metal oxide or hydroxide and/or other well known additives to complete the of of the curable fluoroelastomer composition.

SUMMARY OF THE INVENTION

The present invention provides a process for preparing a fluoroelastomer composition which comprises
A. continuously feeding wet fluoroelastomer crumb to a mixing zone, said crumb having a water content of about 15–35 percent by weight and being the product of coagulating a fluoroelastomer latex,
B. during step A, continuously feeding to said mixing zone at least one finely-divided solid material other than a fluoroelastomer which is useful as a component of a fluoroelastomer composition,
C. continuously mixing said finely-divided material with the wet fluoroelastomer crumb material while passing said materials through a mixing zone and maintaining the particulate nature of said crumb,
D. continuously drying the mixed particulate material obtained in step (C) by passing it through a drying zone.

A preferred embodiment also comprises
E. subjecting the mixed and dried particulate material to pressure while at an elevated temperature below its decomposition temperature to form the material into a fused-together compact mass.

DESCRIPTION OF PREFERRED EMBODIMENTS

It is preferred in most applications to use a fluoroelastomer in step A which is a copolymer of vinylidene fluoride and at least one other fluorine-containing monomer. The "other fluorine-containing monomer" is usually an ethylenically unsaturated monomer containing at least one fluorine atom substituent on each double-bonded carbon atom. The copolymer is preferably composed of at least one of the following: copolymers of vinylidene fluoride and hexafluoropropylene or pentafluoropropylene, copolymers of vinylidene fluoride, tetrafluoroethylene and hexafluoropropylene or pentafluoropropylene, and copolymers of vinylidene fluoride, hexafluoropropylene, and perfluoromethyl perfluorovinyl ether. Especially preferred are the vinylidene fluoride/hexafluoropropylene copolymers in which the monomers are combined in a molar ratio of about 85:15 to 50:50. Useful copolymers of vinylidene fluoride with a perfluoroalkyl perfluorovinyl ether are described in U.S. Pat. No. 3,136,745 issued to Albin and Gallagher; and copolymers of vinylidene fluoride, tetrafluoroethylene and said ether are described in U.S. Pat. No. 3,235,537 issued to the same inventors. Useful copolymers of vinylidene fluoride and pentafluoropropylene are described in U.S. Pat. No. 3,331,823 issued to Sianesi et al.; and copolymers of these two components with tetrafluoroethylene are described in U.S. Pat. No. 3,335,106 issued to Sianesi et al. Other known fluoroelastomers can also be used as the step A fluoroelastomer, for example copolymers of tetrafluoroethylene and a perfluoroalkyl perfluorovinyl ether having 1–5 carbon atoms, and copolymers of tetrafluoroethylene, an olefin and a cure-site monomer (e.g. as illustrated in Example 2 of U.S. Pat. No. 3,579,474 issued to Ro).

The fluoroelastomer crumb of step A can be made by any suitable known method of coagulating a fluoroelastomer latex, followed by washing the resulting crumb and processing it if necessary to provide the desired particle size and water content. The crumb preferably has a water content of about 25–30% by weight. The water content can be determined by drying the crumb for two hours in a drying oven at 204°C. It is preferred that nearly all of the crumb particles have an average diameter of less than 11 millimeters. It is especially preferred that about 95–100% of the crumb particles have an average diameter of less than 5 millimeters.

Useful known methods for preparing fluoroelastomer crumb are described in U.S. Pat. No. 3,536,683 issued to Bailor and Cooper, and in U.S. Pat. No. 3,598,794 issued to Nersasian. The crumb is preferably kept at a temperature of about 15°–50°C. during steps A and C. In most applications, it is preferred to feed the crumb to the mixing zone at a constant rate that results in a nominal residence time in the mixing zone of about 5–15 minutes. Nominal residence time is obtained by dividing the volume of the mixer used by the volumetric flow rate of material into the mixer.

In some of the best embodiments of the process, the finely-divided material used in step B is in the form of a powder containing a cross-linking agent or a vulcanization accelerator for the fluoroelastomer. In an especially useful embodiment, the step B material is a powder which consists essentially of a pre-formed mixture of a cross-linking agent and a vulcanization accelerator for the fluoroelastomer. One of the best examples of such a process employs a hydroxylic aromatic compound as the cross-linking agent and a quaternary phosphonium compound as the accelerator.

Step B can also be carried out by feeding the finely-divided solid material to the mixing zone in the form of an aqueous dispersion. The aqueous dispersion preferably contains about 10–50% by weight of the finely-divided material; and it can be formed by known methods of dispersing powdered materials in water with the aid of a dispersing agent.

Hydroxylic aromatic compounds suitable for use in a curing system for fluoroelastomers, and the amount to be used, are well known in the art. Some of the most useful compounds, including various bisphenols and hydroquinones, are described in U.S. Pat. No. 3,686,143 issued to Bowman (column 2, line 48 to column 3 line 51). One can also use the oxidizable aromatic hydroxy compounds mentioned in U.S. Pat. Nos. 3,655,727 and 3,712,877 issued to Patel et al., as well as esters of hydroxylic aromatic compounds.

Quaternary phosphonium compounds suitable for use in a fluoroelastomer curing system (e.g. benzyl-triphenyl phosphonium chloride), and the amount to be used, are also well known. Such compounds are described for example in Pattison's French patent 71-20887 and in the Patel et al. U.S. Pat. No. 3,712,877.

In making up the step B finely-divided material, the above-described curing ingredients can be replaced or combined with other known fluoroelastomer curing ingredients or other known additives for fluoroelastomer compositions, such as those mentioned in the patents referred to above.

It is usually advisable to feed the step B finely-divided material to the mixing zone at a constant predetermined rate based on the fluoroelastomer content of the crumb, said rate being sufficient to provide the desired amount of additive in the final product.

In the majority of applications, one will prefer that substantially all of the particles of the step B finely-divided material have an average diameter of less than 110 microns. One will especially prefer that about 90–100% of said particles have an average diameter of less than 26 microns.

The step C mixing operation is preferably continued until substantially all of the step B additive particles have become adhered to the step A crumb particles and a substantially uniform mixture of composite particles is obtained. Some of the most useful curing ingredients, such as the preferred quaternary phosphonium compounds, are water-soluble and readily become dissolved and attached on the wet fluoroelastomer crumb particles. One will usually prefer to keep the material in the mixing zone at a temperature of about 15–50°C during step C. The temperature is kept low enough so that the particles do not become harmfully soft or sticky (which would cause the crumb particles to stick to each other), and so that there is no harmful amount of reaction between the fluoroelastomer and curing ingredients or other additives present in the mixture. Thus, uncured composite particles are obtained in step C. A preferred type of mixing apparatus for carrying out step C is described below in Example 1. The well-known Lodige-Littleford Mixer (Model KM–300) and the similar Lodige-Mortion Mixer illustrate very useful mixers. However, one can also use other types of mixing machines known in the art to be useful for the continuous mixing of particulate materials.

In step D of the process, the mixed particulate material obtained in step C is continuously dried by passing it through a drying zone. Preferably all or nearly all of the water is removed from the material. The material can be passed from the mixer outlet onto a conveyer means which carries it through a drying tunnel equipped with means to heat the air which is circulated through the material. As in the case of the step C mixing, the temperature is regulated so that uncured composite particles are obtained in the drying operation. Each dried particle has some of the step B additive material bonded onto a particle of the step A fluoroelastomer crumb. When the process is carried out in a preferred manner, about 99–100% of the step B material is bonded onto the fluoroelastomer crumb particles; and the material leaving the dryer has a volatile material content of about 0–0.5% when tested by drying it at 120°C for four hours.

A preferred embodiment of the process employs a dry-blending operation between drying step D and hot-pressing step E. This involves blending a predetermined quantity (usually a relatively large quantity) of the mixed and dried particulate material resulting from step D. Again the temperature is kept low enough so that an uncured particulate material is obtained. The dry blending operation helps to insure that the particulate material produced during a given production run or period of time has a high degree of uniformity. Thus, a uniform lot of material is obtained.

A very useful way to carry out the step E hot-pressing operation is to pass the mixed and dried particulate material continuously through an extrusion zone (e.g. by using a suitable known extrusion machine as illustrated in Example 1) in which the heat and pressure conditions are sufficient to form the material into a fused-together compact mass. Step E can also be carried out by using other suitable known means for hot-pressing polymeric materials, for example a press capable of pressing the heated material to form bales (e.g. weighing about 20–50 pounds) of fused-together compact material. When the particulate material contains one or more curing ingredients, and it is desired to obtain an uncured material in step E, it will be apparent that the temperature and time conditions used in step E must be low enough to prevent any undue amount of curing reaction to take place.

When the step B finely-divided solid material consists essentially of one or more curing ingredients, the product obtained in step D or step E is a useful article of commerce which can be shipped to plants where the pre-blended product is mixed with other additives, and the resulting completely compounded curable fluoroelastomer composition is used for the manufacture of molded cured fluoroelastomer products. In another embodiment of the process, the step B finely-divided solid material includes all the additives needed to produce a completely compounded curable fluoroelastomer composition.

By using the process of this invention, one can safely and efficiently manufacture fluoroelastomer compositions containing curing ingredients and/or other additives composed of finely-divided solid material.

Since the step B finely-divided solid material readily becomes attached to the step A wet fluoroelastomer crumb, the process greatly facilitates the elimination of dusty air in the plant which can present a health hazard to the workers and which can be harmful to plant machinery. Compared with prior art processes which use dry blending methods, the present process also facilitates the manufacture of a product of uniform quality since the finely-divided additive is easily blended uniformly with and attached to the fluoroelastomer crumb, and the attached additive is very resistant to being separated from the particulate mixture. As illustrated below in Example 1 (step 6), even when the particulate mixture is exposed to a rapidly moving air stream, none or practically none of the additive is separated from the flurorelastomer crumb.

The following Examples illustrate the invention; all amounts are by weight unless otherwise indicated.

EXAMPLE 1

A flurorelastomer composition composed of an intimate blend of a vinylidene fluoride copolymer elastomer and curing ingredients, and suitable for use by manufacturers of cured molded fluoroelastomer products who wish to add fillers and other selected additives to the pre-blended product according to their own production formulas, is prepared by carrying out the steps of:

1. Providing a quantity of wet fluoroelastomer crumb (e.g. about 8000 pounds dry basis) having a water content of 25% and composed of particles having an average diameter of less than 5 millimeters (mostly about 1-2 millimeters). The fluoroelastomer is a vinylidene fluoride/hexafluoropropylene 60:40 copolymer whose Mooney Viscosity ML-10 at 100°C is 62. This copolymer is prepared in the manner described in Moore's German text of Offenlegungschrift 2,161,861, Example 1. The crumb is the product of coagulating a latex of the fluoroelastomer, washing the crumb, and processing it to obtain the specified particle size and water content in the manner taught in the example of Bailor and Cooper U.S. Pat. No. 3,536,683 except the drying operation is omitted. The hopper of step (3) below is filled with the crumb.

2. Providing a quantity of a finely-divided solid additive material (e.g. about 200 pounds) which is a dry powder composed of a uniformly blended mixture of four parts of a cross-linking agent, one part of a vulcanization accelerator for the fluoroelastomer, and 0.5 part of calcium silicate ("Microcel" E). The cross-linking agent is a hydroxylic aromatic compound known as Bisphenol AF or hexafluoroisopropylidene- bis(4-hydroxybenzene). The accelerator is benzyltriphenyl phosphonium chloride. Said blended mixture is the product of mixing the ingredients in a conventional ribbon blender of the horizontal cylinder type. Substantially all of the particles of said mixture have an average diameter of less than 110 microns, and at least 90% have an average diameter of less than 26 microns. The hopper of step (4) below is filled with this dry powder mixture.

3. Continuously feeding the wet fluoroelastomer crumb provided in step (1) from a hopper to a mixer at a constant rate of 300 pounds per hour based on the dry fluoroelastomer content of the crumb. The hopper has straight vertical sides. The crumb, which is kept at a temperature of 30°C, passes from the bottom of the hopper through an ordinary screw auger type of volumetric feeder which feeds the crumb through a tube onto a weigh belt; and the weigh belt carries the crumb into the mixer, which is described below in step (5).

4. During the step (3), continuously feeding the dry powdered mixture of cross-linking agent and accelerator provided in step (2) from a hopper having straight vertical sides to the mixer mentioned in step (3) at a constant rate of 7.5 pounds per hour. This is equal to 2 pounds of cross-linking agent and 0.5 pound of accelerator for each 100 pounds of fluoroelastomer (dry basis) being fed to the mixer. The dry powder, at 25°C, passes from the bottom of the hopper through an ordinary screw type of weight-loss feeder which feeds the powder through a tube into the mixer. The moisture content of the dry powder is kept near zero prior to entering the mixer by passing dry nitrogen gas through the hopper and feeder tube.

5. Continuously mixing the dry powder being fed in step (4) with the wet crumb being fed in step (3) while passing these materials through the mixer and maintaining the particulate nature of the crumb. The material in the mixer is kept at 30°C with the aid of temperature regulation fluid in the mixer jacket. As the materials pass through the mixer, the dry powder additive becomes adhered to the wet fluoroelastomer crumb particles, and a uniform non-dusty mixture of composite particles is formed. Nominal residence time in the mixer is 10 minutes. The mixer is a Lodige-Littleford (Model KM-300) Mixer made by Littleford Brothers Incorporated of Cincinnati, Ohio, and described in their Bulletin No. 212. This mixer is a high intensity mixer which provides relatively high speed efficient continuous mixing of particulate ingredients. It has a total volume of about 10 cubic feet, and a working volume of 5 cubic feet. The main agitator of the mixer has plow-shaped elements on a shaft which rotates at 150 r.p.m.; and it has two choppers equally spaced along the length of the mixer which rotate at 3500 r.p.m. A mixer of this type is also described in the British Journal "Chemical and Process Engineering", July 1971, pages 53–55, wherein it is stated that (a) the Lodige-Morton precision mixer is a variant of the horizontal screw mixer; (b) the mixer has a plow-shaped mixing elements rotating in a horizontal mixing drum where they give an intense three-dimensional motion to the mix; (c) the mixed particles have intersecting trajectories, are reflected from the drum walls, and are picked up again by the plows as the cycle is repeated; (d) the mixer has high-speed cutters (choppers), fitted between the paths of the plows, which are independently operated to break up agglomerates.

6. Continuously drying the mixed particulate material obtained in step (5) by passing it through a drying zone. The moist mixed material passes over the weir at the discharge end of the mixer, through a screw conveyor and oscillating belt feeder, and onto a belt which carries the material through a drying tunnel whose temperature is 60°C at the entrance end and 75°C at the exit end. A blower is used for rapid circulation of the hot air in the drying tunnel. The air passes downward through the material and belt at a velocity of six feet per second. None or practically none of the additive is separated from the crumb during the drying operation despite the use of a rapidly moving air stream; this is quite surprising. The material leaving the drying tunnel has a 0.5% content of volatile matter (mostly water) as measured by drying it at 120°C for four hours.

7. Collecting 8000 pounds of the dried particulate material obtained in step (6) in a slow-speed horizontal cylinder type of paddle mixer while the material is kept at 35°C and while operating the mixer, and blending the material for 8 hours after filling the mixer.

8. Continuously passing the blended particulate material obtained in step (7) through an extrusion zone and subjecting it to heat and pressure sufficient to convert the particulate material into a fused-together compact mass of uncured fluoroelastomer composition. During step (8), the material passes through a valve in the bottom of the step (7) mixer into a hopper of the type described in step (3). The material is fed from the hopper to an extruder at a constant rate of 500 pounds per hour by means of the step (3) type of feeder and weight belt. The extruder temperature is regulated so that the material is extruded at a temperature of 140°C. The extruder used in a NRM Inc. rubber extruder of the general type which has been used in the rubber industry for extruding tire sidewall material. It has a screw diameter of 4.5 inches, a screw length of 45 inches, and a screw channel which gradually becomes shallower towards the exit end to provide gradual compression of the material. Screw speed is 45 r.p.m. The extruder has a 40-mesh screen pack backed up by the breaker plate; and it has a die plate containing six slots, each slot having five round interconnecting holes. As the material leaves the extruder, a photo-cell-controlled cutter cuts the material into 2 × 4 chips.

9. And completing the process by continuously passing the extruded fluoroelastomer composition through a cooling zone until it has cooled to 30°C.

The cooled fluoroelastomer product is put into containers and shipped to a plant where cured molded fluoroelastomer products are manufactured. At this plant, fillers and other additives are mixed with the pre-blended curing agent-containing fluoroelastomer material obtained in step (9), using a two-roll mill whose rolls are at about 25°C. The resulting fully-compounded material has the following formula: 100 parts of fluoroelastomer, 4 parts of magnesia, 2 parts of calcium hydroxide, 30 parts of MT Carbon Black, 0.5 part of the accelerator and 2 parts of the cross-linking agent. The composition is very useful for the molding of O-rings and other products requiring excellent resistance to compression set under high temperature use conditions.

EXAMPLE 2

In a modification of the above example, the dried pre-blended particulate material obtained in step 6 is put into containers and shipped to a plant which manufactures fluoroelastomer O-rings. At this plant, other additives are mixed with the pre-blended material in a Banbury Mixer to produce a fully-compounded material having the formula and utility described in the previous paragraph.

I claim:

1. A process for preparing a fluoroelastomer composition which comprises
  A. continuously feeding wet fluoroelastomer crumb to a mixing zone, said crumb having a water content of about 15–35 percent by weight and being the product of coagulating a fluoroelastomer latex,
  B. during step A, continuously feeding to said mixing zone at least one finely-divided solid material other than a fluoroelastomer which is useful as a component of a fluoroelastomer composition,
  C. continuously mixing said finely-divided material with the wet fluoroelastomer crumb material while passing said materials through a mixing zone and maintaining the particulate nature of said crumb, and
  D. continuously drying the mixed particulate material obtained in step (C) by passing it through a drying zone.

2. A process according to claim 1 wherein the fluoroelastomer of the crumb used in step (A) is a copolymer of vinylidene fluoride and at least one other fluorine-containing monomer, and the crumb has a water content of about 25–30 percent; and the process also comprises (E) subjecting the mixed and dried particulate material to pressure while at an elevated temperature below its decomposition temperature to form the material into a fused-together compact mass.

3. A process according to claim 2 wherein substantially all of the crumb particles have an average diameter of less than 11 millimeters.

4. A process according to claim 3 wherein about 95–100 percent of the crumb particles have an average diameter of less than 5 millimeters, and the crumb is kept at a temperature of about 15–50°C. during step (A).

5. A process according to claim 4 wherein the crumb is fed to the mixing zone at a constant rate that results in a nominal residence time in the mixing zone of about 5–15 minutes.

6. A process according to claim 2 wherein the finely-divided material used in step (B) is in the form of a powder containing a cross-linking agent for said copolymer.

7. A process according to claim 2 wherein the finely-divided material used in step (B) is in the form of a powder containing a vulcanization accelerator for said copolymer.

8. A process according to claim 2 wherein the finely-divided material used in step (B) is a powder consisting essentially of a mixture of a cross-linking agent and a vulcanization accelerator for said copolymer.

9. A process according to claim 8 wherein said cross-linking agent is a hydroxylic aromatic compound and said accelerator is a quaternary phosphonium compound.

10. A process according to claim 5 wherein the finely-divided material used in step (B) is fed to the mixing zone at a constant predetermined rate based on the dry fluoroelastomer content of the crumb, and the material in the mixing zone is kept at a temperature of about 15–50°C. during step (C).

11. A process according to claim 10 wherein substantially all of the particles of said finely-divided material have an average diameter of less than 110 microns.

12. A process according to claim 11 wherein about 90–100 percent of said particles have an average diameter of less than 26 microns.

13. A process according to claim 11 wherein the step (C) mixing is continued until substantially all of the step (B) particles become adhered to the step (A) particles and a substantially uniform mixture of composite particles is obtained.

14. A process according to claim 11 wherein a predetermined quantity of the mixed and dried particulate material obtained in step (D) is blended to insure uniformity prior to step (E).

15. A process according to claim 11 wherein step (E) is carried out by continuously passing the mixed and dried particulate material through an extrusion zone in which the heat and pressure conditions are sufficient to form the material into a fused-together compact mass.

16. A process according to claim 1 wherein the process is discontinued at the end of step (D), thereby resulting in a product which is a dried mixture in particulate form, each dried particle having some of the step (B) additive material bonded onto a particle of the step (A) fluoroelastomer crumb.

* * * * *